Figure 1:
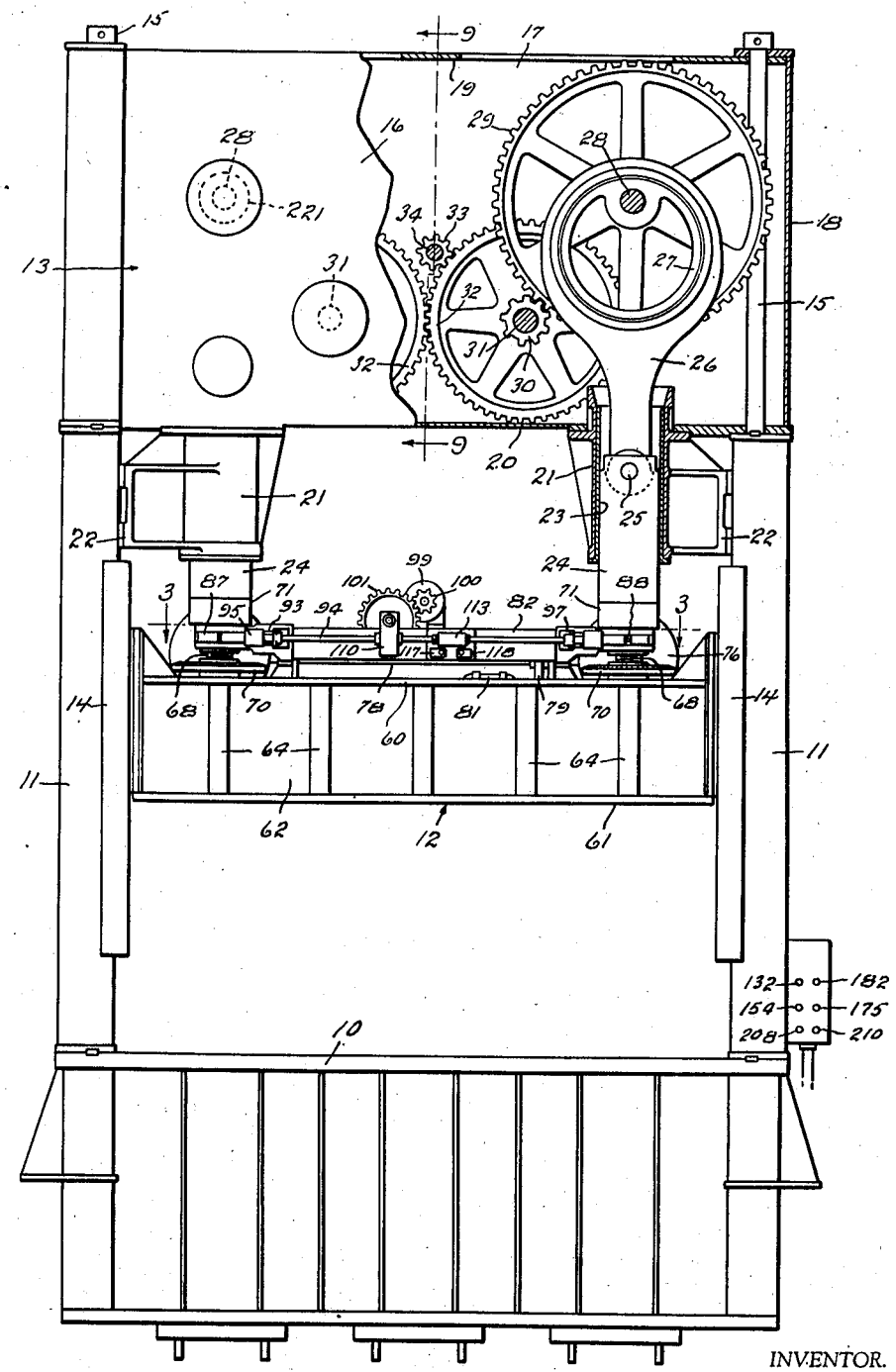

Dec. 26, 1939.  R. B. TREER  2,185,096

PRESS

Filed June 26, 1937  8 Sheets-Sheet 1

INVENTOR.
Ross B Treer
BY Hull Brockwer
ATTORNEY.

Dec. 26, 1939.  R. B. TREER  2,185,096

PRESS

Filed June 26, 1937  8 Sheets-Sheet 4

INVENTOR.
Ross B. Treer
BY Hull Brock West
ATTORNEY.

Dec. 26, 1939.   R. B. TREER   2,185,096
PRESS
Filed June 26, 1937   8 Sheets-Sheet 5
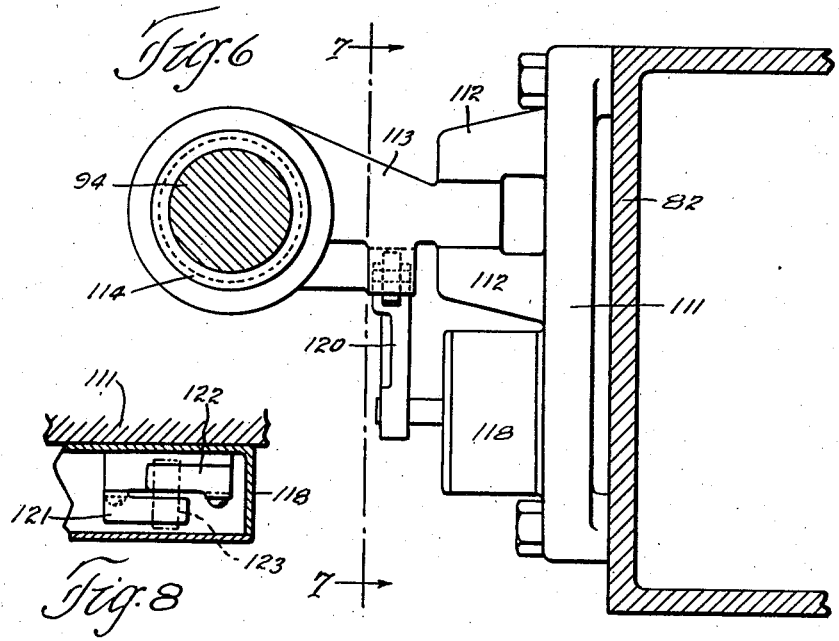
Fig. 6
Fig. 8
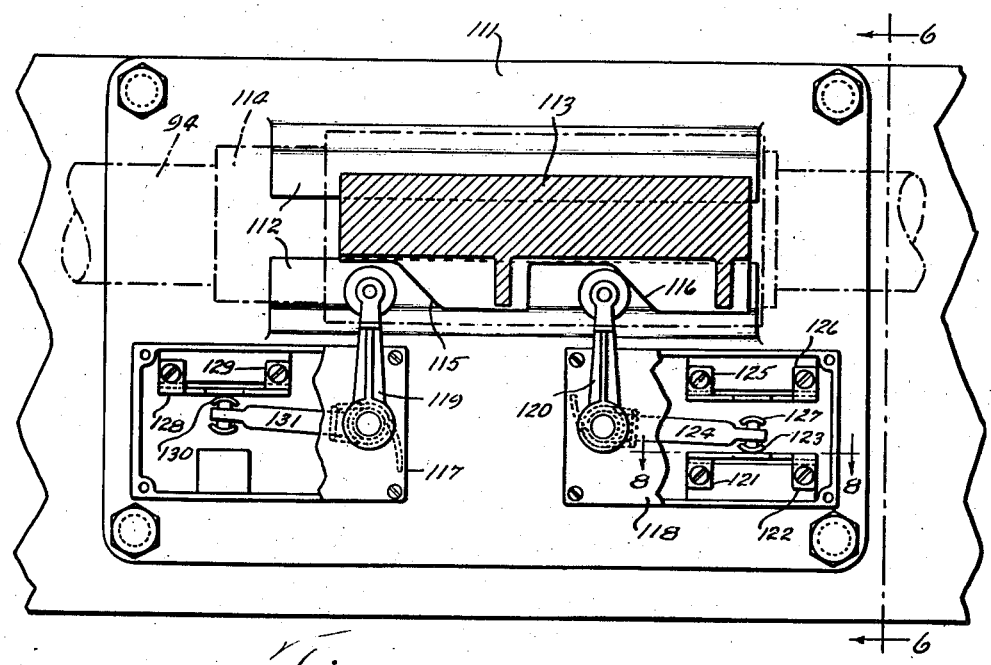
Fig. 7
INVENTOR.
Ross B. Treer
BY Hull Brockwest
ATTORNEY.

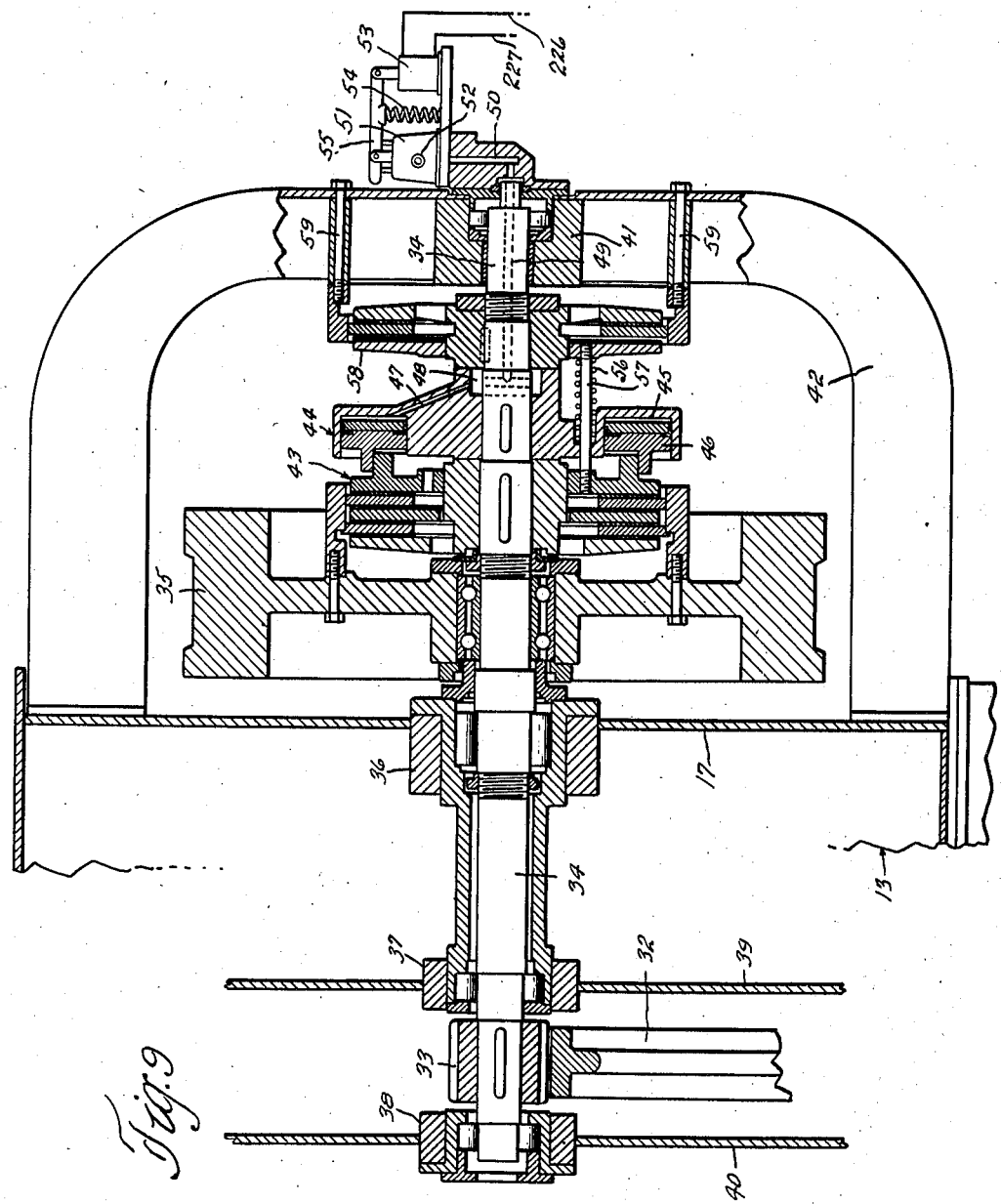

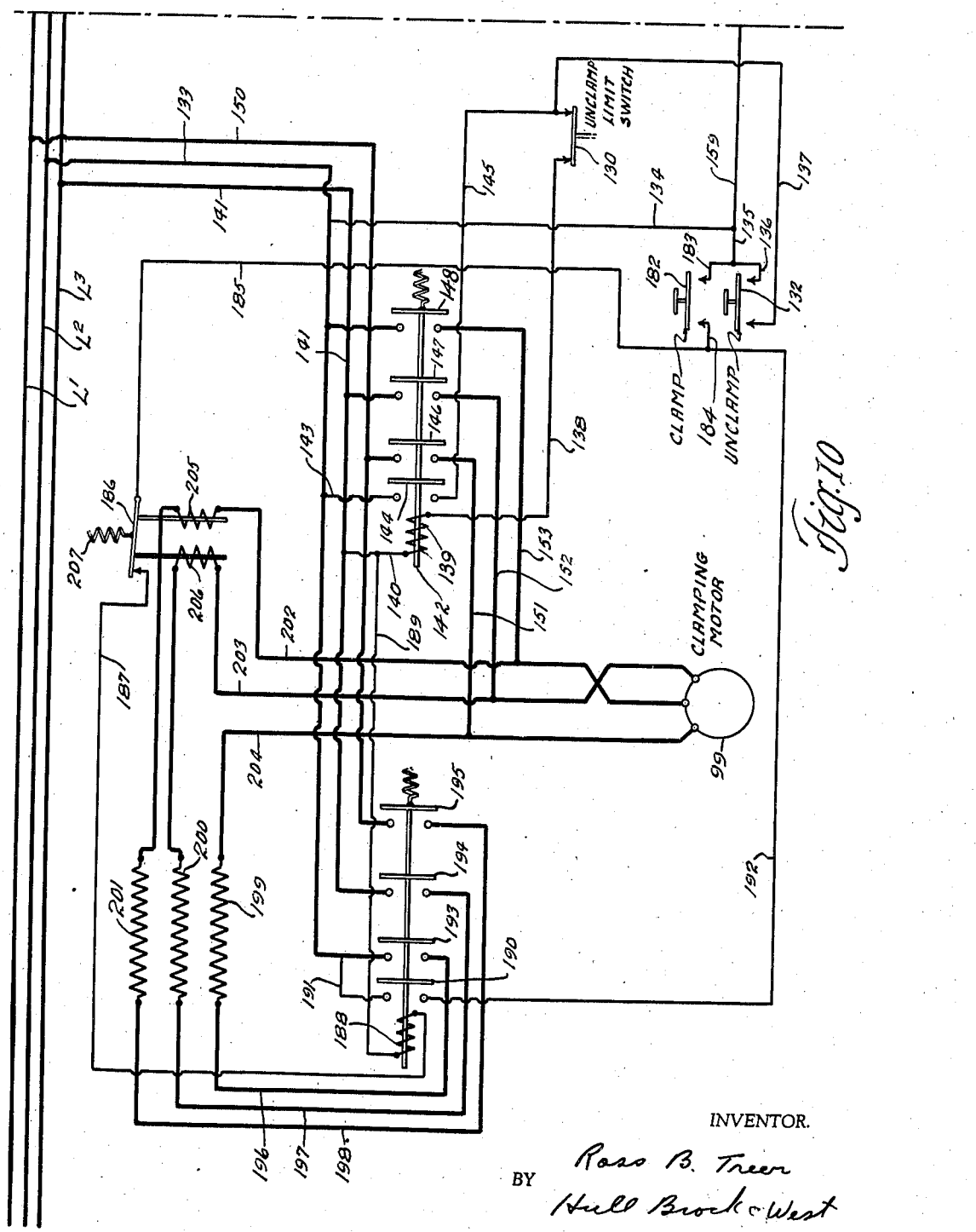

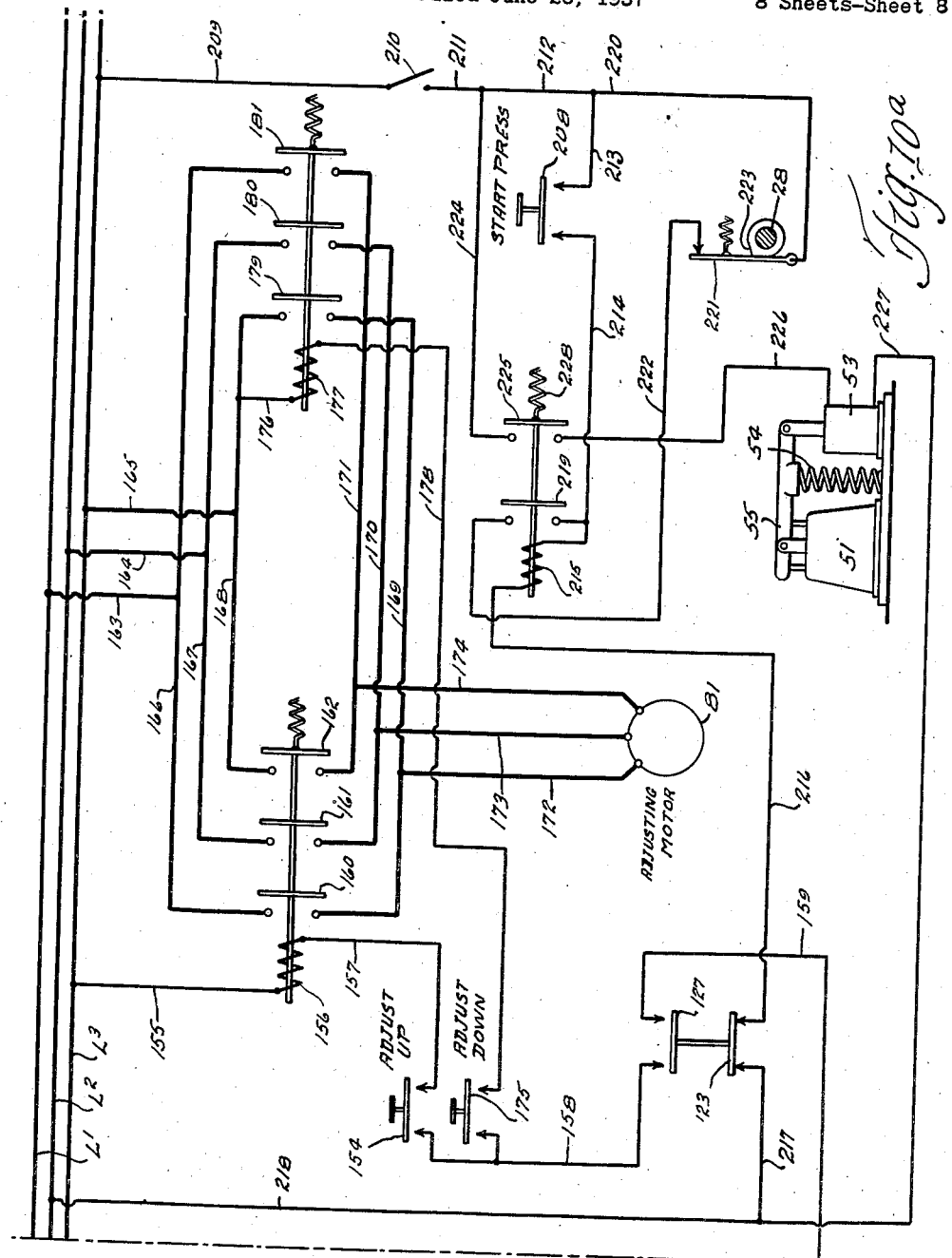

Patented Dec. 26, 1939

2,185,096

UNITED STATES PATENT OFFICE 2,185,096

PRESS

Ross B. Treer, Lakewood, Ohio, assignor to The Cleveland Punch & Shear Works Company, Cleveland, Ohio, a corporation of Ohio Application June 26, 1937, Serial No. 150,651

11 Claims. (Cl. 113—38)

This invention relates to a metal drawing press and has for objects to provide improved adjusting and control mechanism therefor, and improved clamping and unclamping mechanism associated with the adjusting mechanism.

In presses of this character different dies are used for different types of work and it is generally necessary to vary the die spaces, that is, the spaces between the slide and the base, to accommodate different sizes and types of dies. One of the objects of this invention is the provision of means for varying this space by adjusting the position of the slide; another object of the invention is to provide in such a means a control mechanism that makes it impossible to operate the adjusting mechanism when the clamping mechanism therefor is in clamped position, or to operate the slide when the clamping mechanism for the adjusting mechanism is in unclamped position.

A further object is to provide separate and relatively movable clamping and unclamping mechanism and adjusting mechanism.

A further object is to provide control means permitting operation of the pressure through one or a plurality of cycles for any selected adjustment, each cycle being initiated by the operator and completed automatically.

A further object is to provide means for preventing operation of the press during adjustment of the slide or during the unclamping and clamping operations antecedent and subsequent thereto respectively, and to provide for automatically stopping the press in the event the unclamping operation should be attempted during the operation thereof.

A further object is to prevent operation of the adjusting mechanism except as the next succeeding operation after completion of the unclamping operation.

A further object is to provide means whereby upon momentary closing of a switch, the unclamping operation is initiated and automatically completed, the adjusting mechanism is rendered operable and the press operating mechanism is rendered inoperable.

A further object is to provide means whereby upon momentary closing of a switch the clamping operation is initiated and automatically completed, the adjusting mechanism is rendered inoperable and the press operating mechanism is rendered operable.

A further object is to provide an electric motor operated clamping means in combination with means for operating the same to a stall and means responsive to stalling of the motor for deenergizing the same; also means rendering the clamping motor capable of reversing the clamping mechanism from stalled position.

Figure 2:
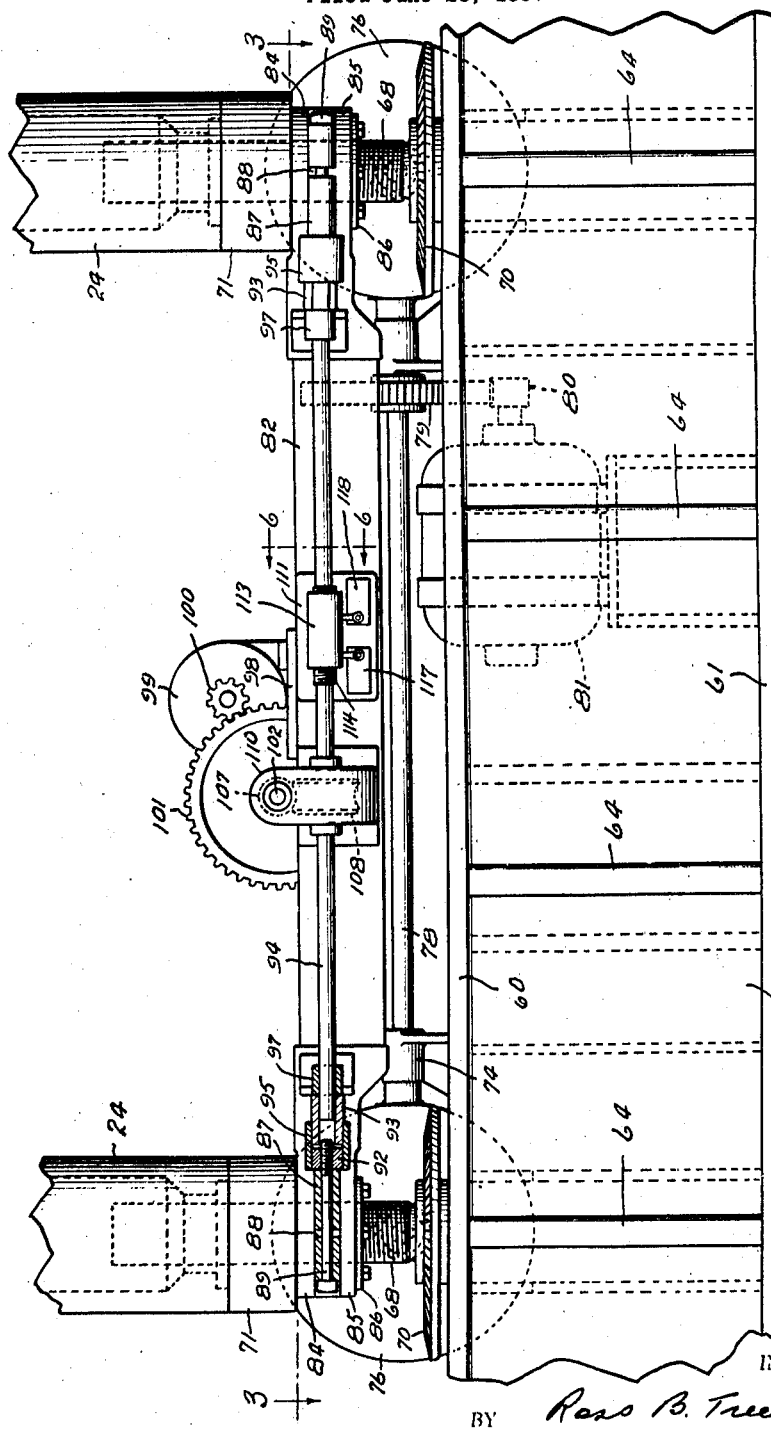
Figure 3:
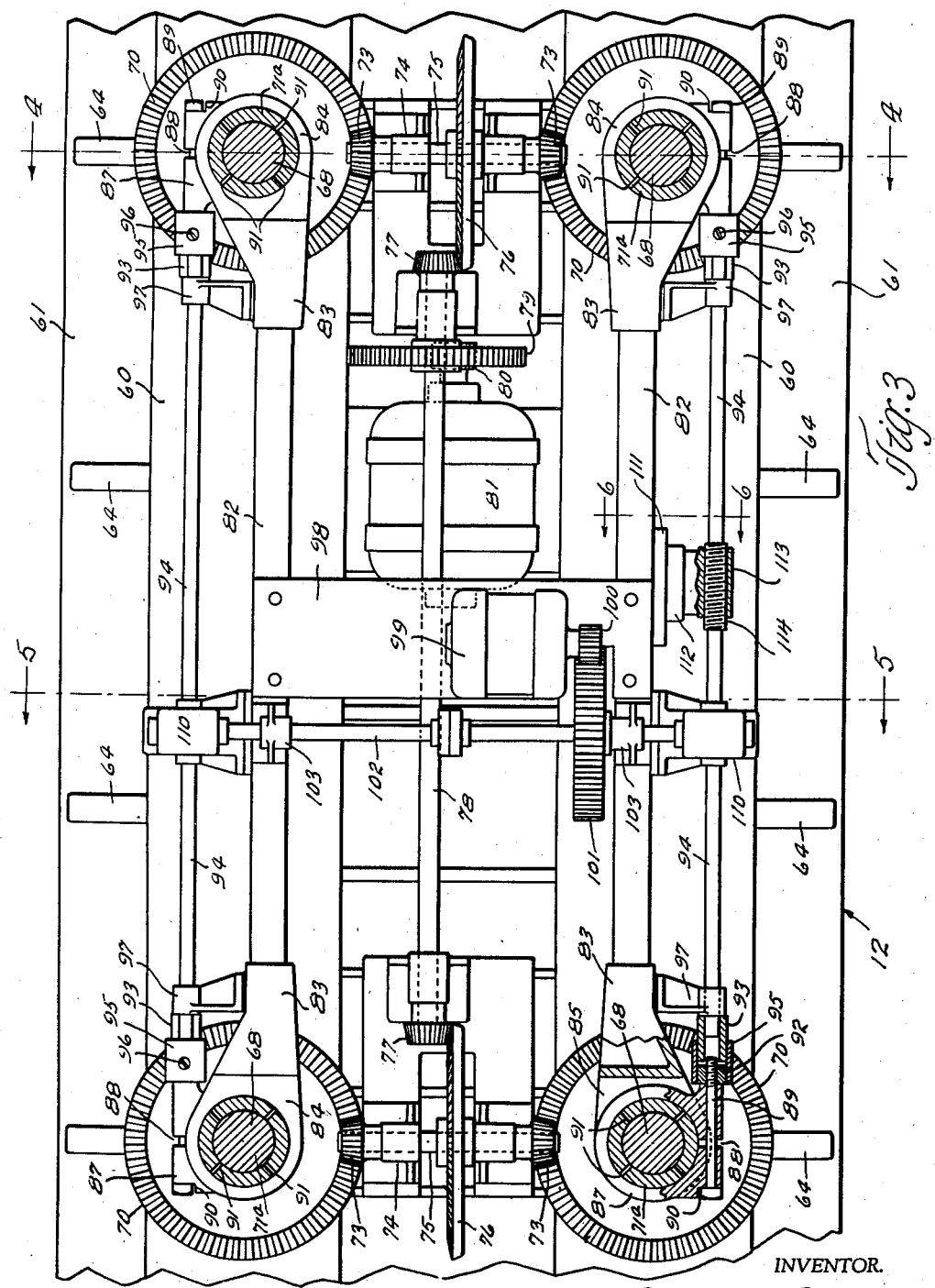
Figure 4:
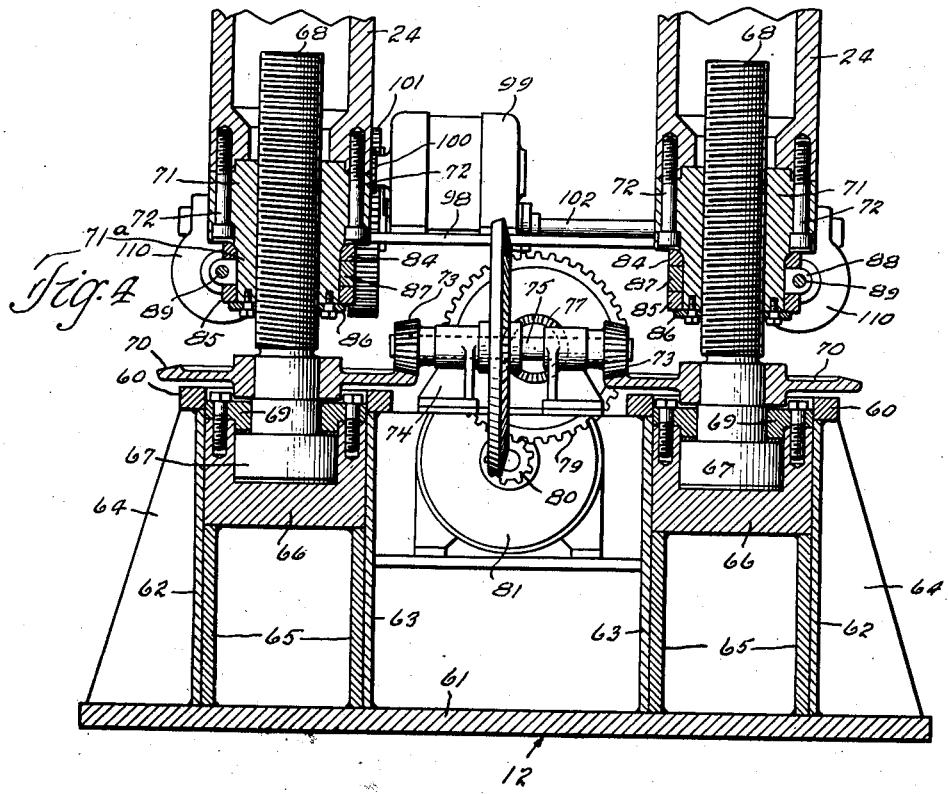
Figure 5:
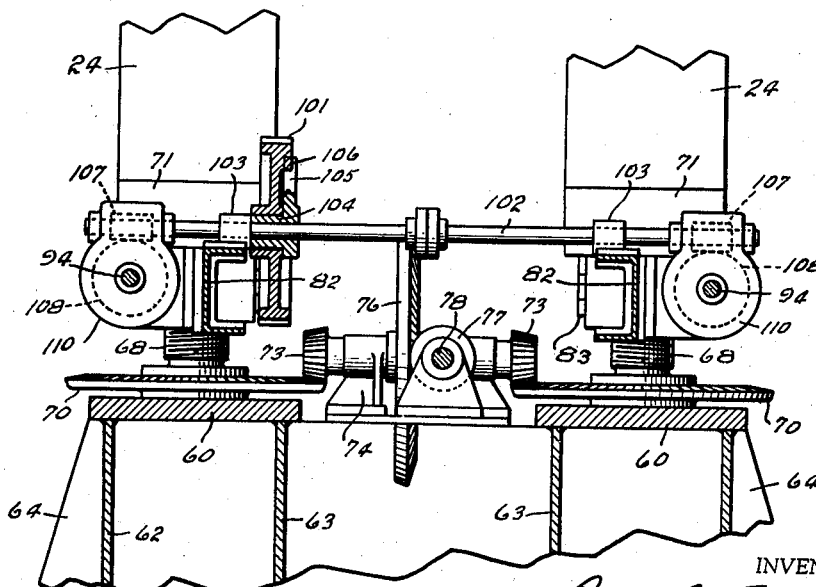

Other objects will be in part apparent and in part pointed out hereinafter in connection with the accompanying drawings wherein Fig. 1 is an elevational view of a press partially in section embodying my invention; Fig. 2 is an enlarged fragmentary elevation showing the slide and closely related mechanism; Fig. 3 is a section on the line 3—3 of Fig. 2; Figs. 4, 5 and 6 are sections on the lines 4—4 and 5—5 of Fig. 3 and 6—6 of Fig. 7, respectively; Fig. 7 is a section on the line 7—7 of Fig. 6; Fig. 8 is a section on the line 8—8 of Fig. 7; Fig. 9 is a fragmentary sectional view corresponding substantially to the line 9—9 of Fig. 1; and Figs. 10 and 10$^a$ taken together constitute a wiring diagram of the electrical controls.

In the drawings, I have shown the various features of my invention applied to a press of more or less usual general construction, having the usual base 10, uprights 11, between which the slide 12 is mounted for vertical reciprocation, and the crown 13 affording a mounting for the means for reciprocating the slide or plunger 12. It is to be understood that the base 10 may be fixed, employing means for holding a die or it may be of the cushion variety provided with pneumatic or other suitable means for resisting downward displacement. The slide 12 is guided between guide members 14 carried by the uprights 11. The base 10, uprights 11 and crown 13 are tied together by means of bolts 15, which is the standard practice in presses of this character.

Press drive

The power transmission which imparts reciprocatory motion to the slide 12 is housed within the crown 13 which is composed of front and rear walls 16 and 17, end walls 18 and top and bottom walls 19 and 20. Received in suitable openings in the bottom wall 20 are fittings 21 mounted on the uprights 11, as indicated at 22. Within the fittings 21 are bushings 23 within which are received reciprocating cross heads 24 connected to the slide 12 in a manner hereinafter to be described. Pivoted to the cross heads 24, as indicated at 25 are connecting rods 26 which at their upper ends are provided with strap bearing portions cooperating with eccentrics 27. The eccentrics 27 are fixed on shafts 28. Fixedly carried by the shafts 28 are gears 29 driven by pinions 30 on shafts 31. Keyed on the shafts 31 are gear 32 meshing with each other. One of the gears 32 is driven by means of a pinion 33 carried by shaft 34.

The motive power for the shaft 34 is derived from any suitable source of power connected with the flywheel or pulley 35 which is coaxial with the shaft 34 but located behind the plate 17, as viewed in Fig. 1. Between the flywheel 35 and the shaft 34 is interposed a combined clutch and brake, consisting mainly of rotating parts coaxial with the shaft 34. The shaft 34 is mounted in a series of bearings, one of which 36 is carried by the plate 17, two others of which, 37 and 38, are carried by plates 39 and 40 parallel to the plate 17 and the right hand one of which 41 is carried by a U-shaped channel member 42 secured to the crown 13. As will be clear from Fig. 9, the flywheel 35 is mounted loosely on the shaft 34 and is adapted to be connected thereto by means of a clutch indicated generally by the numeral 43. The clutch 43 is of the multiple disk variety and, being of usual construction, need not be described in detail.

The clutch 43 is operated by a clutch actuating mechanism indicated generally by the numeral 44 and comprising a cylinder element 45 having an annular piston 46 therein. The piston 46 is actuated by compressed air or other suitable fluid pressure through ducts 47 communicating with an annular chamber 48 which in turn communicates through a T-shaped passage 49 in the shaft 34 with a fixed passage 50 to the interior of a standard three-way valve 51 and thence to a supply pipe 52 for compressed air or other source of fluid pressure. The valve 51 is controlled by a solenoid 53 and a spring 54, it being understood that when the solenoid 53 is energized, the lever 55 will be depressed against the resistance of the spring 54 with the result that compressed air or the like will be admitted to the clutch actuator 44 causing the clutch 43 to be engaged. When the solenoid is not energized, the source of fluid pressure will be cut off and a passage opened for exhaustion of fluid from the annular cylinder 45. It will be understood that when the solenoid 53 is not energized, a plurality of springs 56 mounted on rods 57 will hold the clutch 43 in loose or disengaged position whereby the motion of the flywheel 35 will not be transmitted to the shaft 34. Not only will the springs 56 disconnect the clutch 43 when the solenoid 53 is deenergized, but will simultaneously operate a brake 58 whereby to stop rotation of the shaft 34. The brake 58 is of substantially the same construction as the multiple disk clutch 43, the rotating portion thereof being keyed to the shaft 34 and the fixed portion thereof being mounted on the element 42 by suitable bolts 59.

*Adjusting mechanism*

The slide 12 includes top and bottom plates 60 and 61 connected by longitudinally extending outer and inner plates 62 and 63, such outer plates being reinforced by ribs 64. Interposed between the plates 62 and 63 and engaging the bottom plate 61 are relatively short vertical supporting plates 65 upon which rest blocks 66 secured in any suitable manner to the plates 62 and 63. The blocks 66 are provided with cylindrical openings in their upper surfaces receiving the cylindrical heads 67 of the adjusting bolts 68 which are carried by the cross heads 24. The heads 67 are held in place by thrust elements 69 held in place by suitable studs, as best seen in Fig. 4. Keyed on the bolts 68 above the thrust element 69 are bevel gears 70 which rotate the bolts 68 and thereby move the slide 12 for vertical adjustment with respect to the cross heads 24. The bolts 68 work in nuts 71 which are secured to the cross heads 24 by studs 72. The bevel gears 70 are rotated by bevel pinions 73 mounted on shafts 75 carried by suitable bearing brackets 74. Keyed on the shafts 75 are bevel gears 76 which are driven by bevel pinions 77 carried by a shaft 78 (see Fig. 3).

Fixed on the shaft 78 is a gear 79 which meshes with and is driven by a pinion 80 carried by the armature shaft of a reversible motor 81. It will be noted that the bevel gears 70 located at the same end of the crown 13 are rotated in opposite directions. Accordingly, I provide the corresponding bolts 68 with right and left hand threads respectively so that they will move up and down together. Similarly the bolts 68 at the same side of the crown 13 are provided with right and left threads respectively so that one pair of diagonally positioned bolts 68 rotate in one direction and the remaining pair of diagonally positioned bolts rotate in the opposite direction. It will be obvious that when the motor 81 is energized to rotate in the proper direction, the bolts 68 will be rotated so as to move the slide 12 downwardly whereas when the motor 81 is rotated in the opposite direction, the slide will move upwardly.

*Clamping mechanism*

Extending between the pairs of elements 71 located at each side of the slide 12 are channel beams 82, each end of each of which is connected to a bifurcated fitting 83. Each of the fittings 83 has an upper branch 84 and a lower branch 85. Such branches are provided with openings receiving the lower reduced portions 71ª of the nuts 71. The fittings 83 are supported by the nuts 71 through the medium of plates 86 secured thereto by suitable studs best seen in Fig. 4.

Received between the branches 84 and 85 of the bifurcated elements 83 are clamping rings 87 which rings are split as indicated at 88 and provided with bores for receiving clamp bolts 89. It will be noted that the heads of the bolts 89 are received in suitable notches 90 adapted to prevent rotation of the bolts with respect to the elements 87. As will be clear from Fig. 3, the reduced portions 71ª of the nuts 71 are notched as indicated at 91. The notches 91 extend upwardly to about the shoulder of the nuts 71, that is, they are substantially co-extensive with the reduced portions 71ª. It will thus be clear that when the nuts 92 are tightened on the bolts 89, the split rings 87 will be contracted and will flex the reduced portions 71ª whereby to clamp them firmly against the bolts 68. The nuts 92 are polygonal in cross section as are also the elements 93 which are rotatably carried by the shafts 94. The elements 93 are preferably of the same size as the nuts 92 whereby a sleeve 95 internally polygonal in cross section may be received on both and thereby afford a convenient means of connecting the shaft 94 with the nut 92 at the time of assembly or in case of replacement of the bolt 89 or related parts. Set screws 96 may be provided for preventing longitudinal motion of the sleeves 95 with respect to the elements 93. The elements 93 are rigidly held in proper relation to the nuts 92 by brackets 97 secured to the fittings 83.

Extending transversely of the elements 82 and secured thereto is a platform 98 upon which is mounted a reversible motor 99. A pinion 100 carried by the armature shaft of the motor 99 meshes with the gear 101 carried by a transverse shaft 102 which is mounted in suitable bearing brackets 103 carried by the channels 82. While it is a matter of choice, I prefer to connect the gear 101 to the shaft 102 by lost motion connection whereby, when the motor is started, it may be allowed to attain a suitable momentum before being required to pick up the load. This may be accomplished by any suitable mechanism, such as a sleeve 104 keyed to the shaft 102 and carrying a suitable arm 105 adapted to engage a projection 106 on the gear wheel 101 after having made substantially one turn. The shaft 102 carries suitable worms 107 which mesh with worm gears 108 carried by the shafts 94 and housed within gear boxes 110 secured to the channels 82. It will thus be obvious that upon rotation of the motor 99 in one direction, the clamping elements 87 will be caused to unclamp the elements 71a from the bolts 68 and that, upon rotation of the motor in the other direction, a clamping thereof will be effected.

*Mechanical connection to electrical controls*

Attached to one of the channels 82 (see Figs. 3 and 6) is a plate 111 which carries a pair of guides 112 for a reciprocating element 113, which is provided with an internally threaded opening receiving a threaded portion 114 of one of the shafts 94. A pair of cams 115 and 116 are formed integral with the lower surface of the element 113 as seen in Figs. 6 and 7. Secured to the plate 111 below the guides 112 are switch boxes 117 and 118 containing suitable switches provided with actuating arms 119 and 120 operated by the cams 115 and 116 respectively. Within the switch box 118 is a pair of switch contacts 121 and 122 which are seen in plan view in Fig. 8 and which are adapted to be electrically connected by a bridging switch element 123 carried by the arm 124 when the arm is in the position shown in Fig. 7. Immediately above the contacts 121 and 122 is a similar pair of contacts 125 and 126 adapted to be electrically connected by the switch element 127 carried by the arm 124 when the same is moved upwardly from the position shown in Fig. 7.

Within the switch box 117 is a pair of contacts 128 and 129 similar to those 121 and 122 seen in Fig. 8 and adapted to be electrically connected by a switch element 130 carried by the arm 131 which is actuated by the control arm 119 connected to the arm 131 in the same manner as the control arm 120 is connected to the switch arm 124. The connection between the switch arms 124 and 131, and the control arms 119 and 120 is sufficiently yielding to permit the cams 115 and 116 to move a predetermined desirable distance to the left from the position shown in Fig. 7. The relationship between the cams 116 and the switch arm 124 and switch contacts 125 and 126 is such that almost immediately upon starting the motor 99, the switch element 123 will leave the contacts 121 and 122, and the element 127 will bridge contacts 128 and 129 at approximately the end of the stroke of the element 113, that is, just before the cam 115 causes the arm 131 to open the switch 130.

*Electrical controls and operation*

The electrical controls for the above described mechanism will now be described in connection with the operation of the device, it being understood that the drawings show the various devices in the positions which they will occupy at the beginning of an operation. It will be understood of course that the slide may at the beginning of any operation be at any distance from the press base or bed depending upon the previous adjustment thereof. The power wheel or flywheel 35 will be in rotation continuously while the press is in operation and for the purpose of this description may be considered as at all times being driven from a suitable motor or other source of power.

In order to initiate operation, the operator presses the unclamping switch 132 whereupon a circuit is completed from L² through conductors 133, 134, 135 and 136, switch 132, conductor 137, switch 130, conductor 138, relay winding 139 and conductors 140 and 141 to L³. The winding 139 being thus energized moves the armature 142 to the left thereby completing a holding circuit through the winding 139 independent of the switch 132, such circuit being from L² through conductors 133 and 143, switch element 144, conductor 145, switch 130, conductor 138, winding 139 and conductors 140 and 141 to L³. The winding 139 will thus remain energized and hold the switch elements 146, 147 and 148 in position to complete a three-phase circuit from L¹, L² and L³ through conductors 141, 133 and 150, switch elements 146, 147 and 148 and conductors 151, 152 and 153 to the clamping and unclamping motor 99. The motor 99 operates to loosen the nuts 92 and consequently releases the bolts 68 whereby they become free to rotate within the elements 71. At the same time the rotation of the motor 99 results in moving the element 113 to the left as seen in Fig. 7.

When the motor 99 has operated to move the element 113 a predetermined distance, sufficient to unclamp the bolts, the element 127 contacts the switch points 125 and 126 whereby the adjusting circuit may be closed by the adjusting switches 154 and 175. Almost immediately thereafter the cam 115 operates the arm 119 to open the switch 130 whereby the holding circuit through the relay winding 139 is broken and the motor 99 is stopped. As was stated above, the motion of the element 113 toward the left results very shortly after the beginning thereof in breaking the circuit through the switch 123 and this prevents the possibility of energizing the solenoid 53 to start the press during the unclamping, adjusting and reclamping operation. The switch 123 remains open until nearly the end of the cycle when it closes again to permit operation of the press.

The next operation is to press the proper adjusting switch and to hold the same closed until the desired adjustment has been effected. If it be desired to adjust the slide 12 upwardly, the operator may press the adjusting switch 154 whereupon current will flow from L³ through conductor 155, relay winding 156, conductor 157, switch 154, conductor 158, switch 127 which will then be closed as previously explained, conductor 159 and conductors 134 and 133 to L². This will result in closing the switches 160, 161 and 162 whereby current will flow from L¹, L² and L³ through conductors 163, 164 and 165, conductors 166, 167, 168, switches 160 and 161 and 162, conductors 169, 170 and 171 and conductors 172, 173 and 174 to the adjusting motor 81. The motor 81 will continue to run until the circuit through the switch 154 is broken by the operator, whereupon the winding 156 will be deenergized and the motor 81 will stop.

Should the operator desire to adjust the slide downwardly instead of upwardly, he will close the switch 175 whereupon current will flow from L³ through conductors 165, 168 and 176, relay winding 177, conductor 178, switch 158, switch 175, conductor 158, switch 127, conductor 159 and conductors 134 and 133 to L². This will result in closing the switches 179, 180 and 181 whereupon current will flow from L¹, L² and L³ through conductors 163, 164 and 165, conductors 166, 167 and 168, switches 179, 180 and 181, conductors 169, 170 and 171 and conductors 172, 173 and 174 to the adjusting motor 81, it being observed that in this case two of the leads to the motor 81 are reversed as compared with the connection made when the switch 154 is closed whereby such motor operates in a reverse direction resulting in downward motion of the slide 12.

The slide having been adjusted as desired, the operator will press the clamping switch 182 whereupon current will flow from L² through conductors 133, 134, 135 and 183, switch 182, conductors 184 and 185, thermal relay switch 186, conductor 187, relay winding 188 and conductors 189, 140 and 141 to L³. Energization of the winding 188 will result in closing the switch 190 whereupon a holding circuit is formed from L² through conductors 133, 191, switch 190, conductors 192 and 185, thermal relay switch 186, conductor 187, winding 188 and conductors 189, 140 and 141 to L³. At the same time the switch 190 is closed, switches 193, 194 and 195 are closed whereby a three-phase circuit is made through conductors 141, 133 and 150, switches 193, 194 and 195, conductors 196, 197 and 198, thermal relay heating elements 199, 200 and 201 and conductors 202, 203 and 204 to the clamping motor 99, relay windings 205 and 206 being interposed between a thermal relay element 201 and conductor 202 and thermal element 200 and conductor 203 respectively. This circuit is maintained until the motor 99 stalls whereupon excessive current passes through the thermal relay heating elements 199, 200 and 201 resulting in an increase in resistance and a weakening of the attracting force of windings 205 and 206 whereby the spring 207 operates to open the switch 186.

It will now be clear that the reverse operation of the motor 99 will have restored the element 113 to the position shown in Fig. 7 whereby the switch 127 is open as indicated in Fig. 10ᵃ and the switch 123 is closed.

The operator now presses the starting switch 208 whereupon current flows from L³ through conductor 209, manual switch 210, conductors 211, 212 and 213, switch 208, conductor 214, relay winding 215, conductor 216, switch 123, conductor 217 and conductor 218 to L². Energization of the winding 215 will close the switch 219 whereupon current will flow from L³ through conductor 209, switch 210, conductors 211, 212, 220, switch 221, conductor 222, switch 219, winding 215, conductor 216, switch 123 and conductors 217 and 218 to L². It will be observed that this circuit depends upon switch 221 being closed. The switch 221 is controlled by a cam 223 on the shaft 28 whereby when the press has been operated the desired distance, the holding circuit through the switch 219 will be broken and consequently the solenoid 53 will be deenergized, its circuit being from L³ through conductor 209, switch 210, conductors 211 and 224, switch 225, conductor 226, solenoid 53 and conductors 227 and 218 to L². When the holding circuit through switch 219 and winding 215 is broken, the switch 225 will be opened by the spring 228 and the solenoid 53 consequently deenergized. As previously explained, deenergization of the solenoid 53 will result in disengagement of the clutch 43 and application of the brake 58 whereupon the press will be suddenly brought to a stop. While as has been stated, the cam 223 on the shaft 28 controls the switch 221, it is to be understood that the switch 221 may be operated by any suitable part of the press drive whereby it becomes possible to impart to the slide the desirable movement previous to disengaging the clutch 43. A simple arrangement of the switch 221 would be one causing the press to make one complete rotation of the shafts 28 and stop. Numerous others are obviously possible and well within the contemplation of the invention. The arrangement of the cam 223 is such that when the press reaches a predetermined point, the switch 221 will be opened momentarily and allowed to close again by the motion of the press parts between the time of such opening of the switch 221 and the time the press actually comes to a full stop.

From the foregoing it will be apparent that I have provided a device which is well adapted to accomplish the above stated objects and while I have shown and described the present preferred embodiment, I wish it understood that changes may be made within the scope of the invention and that I am limited only in accordance with the appended claims.

Having thus described my invention, what I claim is:

1. In a press, in combination, a reciprocable slide, slide reciprocating means having an expansible element connected to said slide, motor operated means for adjusting said expansible element, motor operated means for clamping the same against adjustment, and means responsive to operation of the last mentioned means to unclamping position for rendering said slide reciprocating means inoperable and responsive to operation thereof to clamping position for rendering said slide reciprocating means operable.

2. In a press, in combination, a reciprocable slide, slide reciprocating means having an expansible element connected to said slide, motor operated means for adjusting said expansible element, motor operated means for clamping the same against adjustment, and means responsive to operation of the last mentioned means to unclamping position for rendering said adjusting means operable and responsive to operation to clamping position to render said adjusting means inoperable.

3. In a press, in combination, a reciprocable slide, slide reciprocating means having an expansible element connected to said slide, motor operated means for adjusting said expansible element, motor operated means for clamping the same against adjustment, and means responsive to operation of the last mentioned means to unclamping position for rendering said slide reciprocating means inoperable and said adjusting means operable and responsive to operation thereof to clamping position for rendering said slide reciprocating means operable and said adjusting means inoperable.

4. In a press, in combination, a reciprocable slide and cooperating frame, crown and bed parts, electrically controlled means, including adjustable connectors, for reciprocating said slide, said connectors comprising relatively movable parts for increase or decrease of the effective lengths thereof, mechanism for clamping said relatively movable parts together, electrically controlled means for operating said clamping mechanism to and from clamping position, electrically controlled mechanism for adjusting said relatively movable parts when not clamped together, and means responsive to motion of the operating means for the clamping mechanism toward unclamping position for rendering the slide reciprocating means inoperable.

5. In a press, in combination, a reciprocable slide and cooperating frame, crown and bed parts, electrically controlled means, including adjustable connectors, for reciprocating said slide, said connectors comprising relatively movable parts for increase or decrease of the effective lengths thereof, mechanism for clamping said relatively movable parts together, electrically controlled means for operating said clamping mechanism to and from clamping position, electrically controlled mechanism for adjusting said relatively movable parts when not clamped together, and means responsive to motion of the operating means for the clamping mechanism toward unclamping position for rendering the slide reciprocating means inoperable and rendering the adjusting mechanism operable.

6. In a press, in combination, a reciprocable slide and cooperating frame, crown and bed parts, electrically controlled means, including adjustable connectors, for reciprocating said slide, said connectors comprising relatively movable parts for increase or decrease of the effective lengths thereof, mechanism for clamping said relatively movable parts together, electrically controlled means for operating said clamping mechanism to and from clamping position, electrically controlled mechanism for adjusting said relatively movable parts when not clamped together, and means responsive to motion of the operating means for the clamping mechanism to clamped position for rendering the adjusting means inoperable.

7. In a press, in combination, a reciprocable slide and cooperating frame, crown and bed parts, electrically controlled means, including adjustable connectors, for reciprocating said slide, said connectors comprising relatively movable parts for increase or decrease of the effective lengths thereof, mechanism for clamping said relatively movable parts together, electrically controlled means for operating said clamping mechanism to and from clamping position, electrically controlled mechanism for adjusting said relatively movable parts when not clamped together, and means responsive to motion of the operating means for the clamping mechanism to clamped position for rendering the adjusting means inoperable and rendering the slide reciprocating means operable.

8. In a press, in combination, a reciprocable slide and cooperating frame, crown and bed parts, electrically controlled means, including adjustable connectors, responsive to an initial switch closing operation, for automatically reciprocating said slide through a predetermined cycle and bringing it to rest at the end of such cycle, said connectors comprising relatively movable parts for increase or decrease of the effective lengths thereof, mechanism for clamping said relatively movable parts together, electrically controlled means, responsive to an initial switch closing operation for operating the clamping mechanism automatically to a predetermined extent, and electrically controlled mechanism for adjusting said relatively movable parts, said last mentioned electrically controlled means being operable responsive to a second initial switch closing operation for automatically operating said clamping mechanism to full clamping position.

9. In a press, in combination, a reciprocable slide and cooperating frame, crown and bed parts, electrically controlled means, including adjustable connectors, responsive to an initial switch closing operation, for automatically reciprocating said slide through a predetermined cycle and bringing it to rest at the end of such cycle, said connectors comprising relatively movable parts for increase or decrease of the effective lengths thereof, mechanism for clamping said relatively movable parts together, electrically controlled means, responsive to an initial switch closing operation for operating the clamping mechanism automatically to a predetermined extent, and electrically controlled mechanism for adjusting said relatively movable parts, said last mentioned electrically controlled means being operable responsive to a second initial switch closing operation for automatically operating said clamping mechanism to full clamping position and rendering the slide reciprocating means operable.

10. In a metal drawing press, in combination, a reciprocable slide and cooperating frame, crown and die supporting bed, electrically controlled means, including adjustable connectors, for reciprocating said slide, said connectors comprising nuts having compressible portions and rotatable bolts received therein, clamping means associated with the compressible portions of each nut, electrically controlled means for operating said clamping means to and from clamping and unclamping positions, switches and switch operating mechanism associated with said last means and operated thereby, electrically controlled means for rotating said bolts for adjustment of said slide, and means including said switches and switch operating mechanism operated by said clamping means, for rendering said first means inoperable when said clamping means is in unclamped position.

11. In a press, in combination, a reciprocable slide and cooperating frame, crown and bed parts, electrically controlled means, including adjustable connectors, for reciprocating said slide, said connectors comprising nuts having compressible portions and rotatable bolts received therein, clamping means associated with the compressible portions of each nut, electrically controlled means for operating said clamping means to and from clamping and unclamping positions, switches and switch operating mechanism associated with said last means and operated thereby, electrically controlled means for rotating said bolts for adjustment of said slide, and means including said switches and switch operating mechanism operated by said clamping means for rendering said first means inoperable when said clamping means is in unclamped position and for rendering said bolt rotating means inoperable when said clamping means is in clamped position.

ROSS B. TREER.